US007706798B2

(12) United States Patent
Hurst

(10) Patent No.: US 7,706,798 B2
(45) Date of Patent: Apr. 27, 2010

(54) DISCOVERY OF NEIGHBOUR CELL BEACON FREQUENCIES IN MOBILE NETWORKS

(75) Inventor: Michael Hurst, Edinburgh (GB)

(73) Assignee: Agilent Technologies, Inc., Santa Clara, CA (US)

( * ) Notice: Subject to any disclaimer, the term of this patent is extended or adjusted under 35 U.S.C. 154(b) by 993 days.

(21) Appl. No.: 11/370,821

(22) Filed: Mar. 8, 2006

(65) Prior Publication Data

US 2006/0240829 A1    Oct. 26, 2006

(30) Foreign Application Priority Data

Apr. 26, 2005    (GB) ................... 0508367.0

(51) Int. Cl.
*H04W 36/00*    (2009.01)
(52) U.S. Cl. ................. 455/436; 455/452.1; 455/456.2; 370/331; 370/332
(58) Field of Classification Search ............. 455/432.1, 455/435.2, 436, 437, 438, 440, 442, 446, 455/447, 452.2, 560, 561, 67.11, 513, 412.1, 455/515, 516, 517, 67.16; 370/310, 329, 370/331, 328
See application file for complete search history.

(56) References Cited

U.S. PATENT DOCUMENTS

| 5,778,317 | A | 7/1998 | Kaminsky | 455/450 |
|---|---|---|---|---|
| 6,088,587 | A | 7/2000 | Abbadessa | 455/424 |
| 6,181,682 | B1 | 1/2001 | Abbadessa et al. | 370/328 |
| 6,192,244 | B1 | 2/2001 | Abbadessa | 455/436 |
| 6,498,934 | B1 | 12/2002 | Muller | 455/450 |
| 6,556,829 | B1 | 4/2003 | Persson | 455/437 |
| 6,904,020 | B1 * | 6/2005 | Love et al. | 370/252 |
| 2002/0102994 | A1 * | 8/2002 | Tuutijarvi | 455/456 |
| 2005/0048974 | A1 * | 3/2005 | Kim et al. | 455/436 |

FOREIGN PATENT DOCUMENTS

| EP | 0848567 | 6/1998 |
|---|---|---|
| EP | 0851700 | 7/1998 |
| EP | 0 895 435 | 2/1999 |
| EP | 1 304 897 | 4/2003 |
| GB | 2 357 399 | 6/2001 |
| GB | 2 382 503 | 5/2003 |
| GB | 2 397 724 | 7/2004 |

OTHER PUBLICATIONS

European Search Report dated Apr. 21, 2008.

* cited by examiner

*Primary Examiner*—Jean A Gelin

(57) ABSTRACT

In order to discover at least part of a frequency list used by an active wireless device in a cellular communications network for neighbour cell signal measurements, measurement reports are extracted from messages carrying reports of measurements relating to propagation of wireless signals between the network and the device. Additional information (such as identity of sections of the network adjacent to a current serving cell for the device) is extracted from other messages, and the extracted measurement reports and additional information are combined to discover the required frequency list.

7 Claims, 6 Drawing Sheets

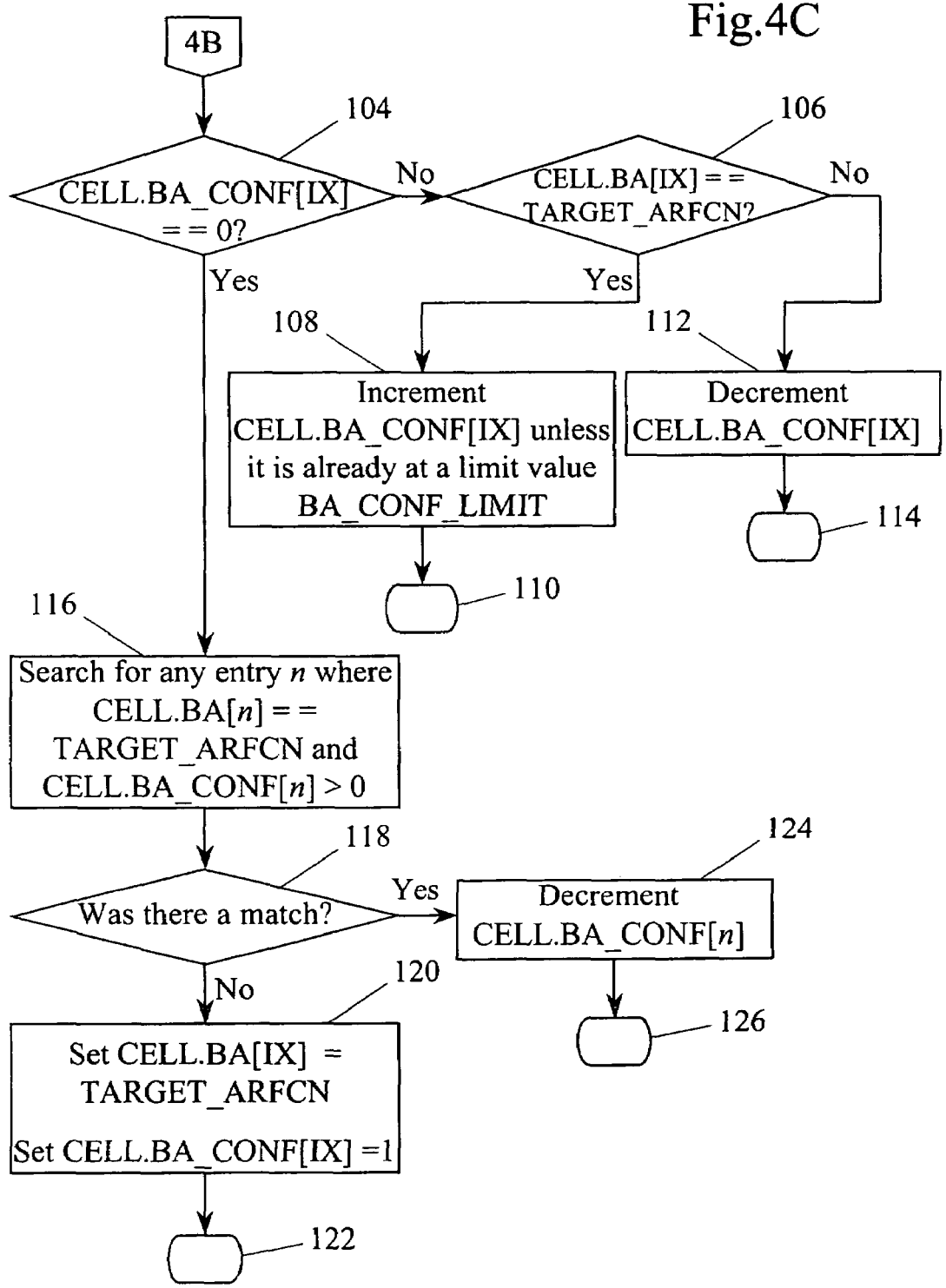

DISCOVERY OF NEIGHBOUR CELL BEACON FREQUENCIES IN MOBILE NETWORKS

This invention relates to methods and apparatus for discovering beacon frequencies of neighbour cells in cellular mobile telephone networks, such as those conforming to the Global System for Mobile Communication (GSM) standard.

BACKGROUND ART

The present invention has particular application to cellular mobile radio systems operating according to the GSM, DCS1800 or the PCS1900 standards. Systems operating according to these standards, including derivatives thereof, will be hereinafter be referred to as "GSM-type" systems. It should, however, be noted that the present invention is not restricted to a GSM-type system.

Cellular mobile radio systems, such as GSM-type systems, comprise a fixed part having switching elements and radio elements providing radio coverage in a plurality of cells, and mobile stations (MSs) for communicating with the fixed part of the system. Cells are often logically grouped into location areas. Within each cell, radio coverage is provided by one or more radio elements, which, in the case of GSM-type systems, comprise elementary transceivers termed TRXs (Transmitter Receiver). Radio elements are grouped within Base Transceiver Stations (BTS) which communicate with Base Station Controllers (BSC). The interface between a BTS and BSC, within a GSM-type system, is referred to as the A-bis interface, and individual links (generally comprising two physical channels) on this interface are termed A-bis links. BSCs communicate with mobile switching centres (MSC) via what is termed the A interface.

In a GSM-type system a specific radio frequency for each cell always plays a very important role in the operation of that cell. This frequency, which is used by control channels, is known as the Broadcast Control Channel (BCCH) frequency. It is characterised by continuous emission, fixed transmission power level and prohibition on frequency hopping. For this reason it is also sometimes called the cell "beacon frequency". In a GSM-type system each cell is allocated a respective BCCH frequency and, since there are generally more cells in a network than different such frequencies available, the same BCCH frequency may be used by many cells in the network. Normally a particular BCCH frequency will not be used by multiple cells that are geographically close to each other, to minimise interference. Nonetheless, owing to the limited number of frequencies available it is possible for an MS to receive control channel signals on the same BCCH frequency from two or more different cells.

Another identity that is used in a GSM-type system is the Base Station Identity Code (BSIC), which is typically allocated to a group of cells adjacent to one another. The BSIC allows MSs to discriminate between different cells transmitting their control channels on the same BCCH frequency. The BSIC comprises a network "colour code" (NCC) and a base station colour code (BCC). The pair of BCCH frequency+BSIC is often used in GSM-type systems to identify a cell for radio purposes such as handover. BCCH frequency+BSIC is normally unique within a local geographic area, but not necessarily unique within a network.

MSs continuously make measurements of the receive level on the BCCH frequency of neighbour cells. This is to help choose the best serving cell when the MS is idle ("camping on"), and to aid the cell handover procedure when the MS is active—an active MS is one that is:

(a) performing a Location Update;
(b) engaged in set-up for a Mobile-Originated or Mobile-Terminated call;
(c) engaged in an active Mobile-Originated or Mobile-Terminated call;
(d) allocated a traffic channel or data channel on the air interface for any other reason—e.g. sending or receiving packet-switched data or a Short Message Service (SMS) message.

In order to speed and simplify the task of the MS in scanning for neighbouring cell BCCH frequencies, the network explicitly provides a list of BCCH frequencies that the MS should monitor. This list is known as the BCCH Allocation list or BA list. It is continuously sent out on the broadcast channel of each cell in order to be received by MSs that are in idle mode. It is also continuously sent to each MS that is in active mode on a Slow Associated Control Channel (or SACCH) associated with the active traffic or data channel. The two BA lists (the one transmitted to idle MSs and that transmitted to active ones) are known as the BA(BCCH) and BA(SACCH) respectively. Note that the BA(BCCH) and BA(SACCH) do not necessarily contain the same list of frequencies.

In a GSM-type system the BA(SACCH) downloaded to an active MS may be a cell default list that is identical for all active MSs in the cell, or it may be a channel-specific list associated with the current use of a particular air-interface channel by a particular MS. A channel-specific BA(SACCH) may be different from the cell default BA(SACCH). Whether a channel-specific BA(SACCH) or a cell default BA(SACCH) is in use by a particular active MS, the method of download of the BA(SACCH) over the air interface is the same—on the Slow Associated Control Channel as described above. However the way a channel-specific BA(SACCH) and cell default BA(SACCH) are set up in the BTS by the BSC is different.

The cell default BA(SACCH) is sent to the BTS by the BSC in an A-bis SACCH FILLING message on the A-bis interface between the BSC and BTS. The BTS stores this BA(SACCH) and autonomously transmits it on the downlink SACCH to each active MS that is not using a channel-specific BA(SACCH). In practice the BSC may not send SACCH FILLING messages to the BTS very often; for example it might be only on BTS or BSC software reboot, or when a frequency plan or neighbour cell list is changed. Thus days or weeks may elapse between transmission of the cell default BA(SACCH) over the A-bis interface from a BSC to a BTS.

As mentioned above the GSM specifications allow an active MS to have a different BA(SACCH) to the cell default BA(SACCH); that is, a channel-specific BA(SACCH). In this case the BSC is directly responsible for programming the channel-specific BA(SACCH), by sending it to the BTS either in an A-bis CHANNEL ACTIVATION message that activates an air-interface channel or in an A-bis SACCH INFORMATION MODIFY message relating to an already-active air-interface channel. Most current GSM-type systems tend to use a cell default BA(SACCH) rather than channel-specific BA(SACCH).

As also mentioned above, MSs make measurements of the receive level on the BCCH frequency of neighbouring cells. When in active mode (e.g. when a telephone call is taking place) these measurements are periodically reported to the network. This enables the network to make decisions about the need for "handing over" to a cell offering better signal quality than the current serving cell. A Direct Transfer Application Part (DTAP) Measurement Report message is used for this purpose—see technical specification 3GPP TS 44.018

"Mobile radio interface layer 3 specification; Radio Resource Control (RRC) protocol", section 10.5.2.20. These measurements are sent at a rate of about two per second.

Constraints on the maximum size of signalling messages sent over the air interface limit the number of neighbour cells for which receive level measurements can be reported. In a GSM system this limit is six. In the event that the receive level on the BCCH frequency of more than six neighbour cells is measured, only the measurements corresponding to the six neighbour cells with best receive level are reported. The constraint on the size of signalling messages on the air interface also affects the way in which neighbour cell measurements are reported. Each neighbour cell measurement consists of three values:

BCCH-FREQ-NCELL i
BSIC-NCELL i
RXLEV-NCELL i

The BCCH-FREQ-NCELL i indicates the BCCH frequency of the $i^{th}$ neighbour cell, where i is between 1 and 6 for GSM networks. However BCCH-FREQ-NCELL i is not the absolute radio frequency of the neighbour cell beacon signal, but an index, starting with 0, of the position of the neighbour cell beacon frequency within the BA(SACCH) for the serving cell. Thus the BA(SACCH) needs to be known before the neighbour cell frequency, and hence neighbour cell identity, can be determined. BSIC-NCELL i and RXLEV-NCELL i are the BSIC value and received signal strength respectively of the $i^{th}$ neighbour cell. More details of the semantics and coding of these parameters are contained in 3GPP TS 44.018 cited above, Table 10.5.2.20.1 and Figure 10.5.2.10.1.

The neighbour cell measurement reports described above exist primarily for the network to manage handovers between cells. However the reports contain valuable data on the radio frequencies and signal levels currently being measured by the MS. Therefore the neighbour cell measurement data can be used for other applications in addition to the control by the network of handovers. Such other applications include cell RF planning (for example see U.S. Pat. No. 6,192,244), monitoring quality of service (QoS) of the radio interface, and determining MS position (for example see EP 1 304 897). These other applications for the measurement reports may be implemented by the network elements such as the BSC. Alternatively an external link monitoring system may also be used, as described in the two patent references cited above.

Any application that wishes to make use of neighbour cell measurement reports needs to know the BA(SACCH) downloaded from the serving TRX to the MS in order to be able to convert the BCCH-FREQ-NCELL i contained in the DTAP Measurement Report messages into the corresponding absolute radio frequency, and from that derive the neighbouring cell identity.

An issue for an application based on link monitoring is obtaining the BA(SACCH) currently being used by each MS. In particular, as explained above, the cell default BA(SACCH) may be transmitted only very infrequently over the links between the BSC and BTS, and hence it could be a long time (days or weeks) before use can be made of neighbour cell measurement reports. In addition there is a more subtle difficulty associated with BTS restarts. If a BTS is restarted it is likely that a cell default BA(SACCH) will be downloaded over the A-bis interface using an SACCH FILLING message. However a BSC or BTS restart can result in a re-mapping of the A-bis signalling channels within the timeslots on the physical links between the BSC and BTS. Those skilled in the art will know that it is possible to search for signalling channels carried in timeslots on such TDM links—for example by looking for valid high-level data link control (HDLC) frames within timeslots. Then methods such as those described in U.S. Pat. No. 6,088,587 may be used to re-discover the signalling channels to each TRX at the BTS. However, it is highly likely that the SACCH FILLING messages transmitted at BTS restart will be missed by the link monitoring system while signalling channel discovery takes place after the restart.

Existing solutions for BA(SACCH) configuration or discovery include:

1) Manually configure the BA(SACCH) for each BTS into the link monitoring system. This is both error prone and inconvenient.
2) A method of BA(SACCH) discovery, such as that described in U.S. Pat. No. 6,192,244, that does not rely on seeing SACCH FILLING messages. However this method is described in the context of an application analysing neighbour cell allocation. The method is not real-time in nature, requiring collection of quantities of A-bis signalling data and then analysing it (the example described refers to data collection over a period of days). Furthermore, the correlation algorithms employed by the method are complex.

It would therefore be advantageous to have another method of discovering the cell default BA(SACCH) that allows the neighbour cell measurements in Measurement Report messages to be associated with the correct cells. This invention provides such an alternative method.

DISCLOSURE OF INVENTION

According to one aspect of this invention there is provided a method of discovering at least part of a frequency list used by an active wireless device in a cellular communications network for neighbour cell signal measurements, comprising:

monitoring at least one signalling link carrying messages between two elements of the communications network;

selecting monitored messages of a first type carrying reports of measurements relating to propagation of wireless signals between the network and the device;

extracting reports of measurements from the messages of the first type, independently of operation of said two elements of the network;

selecting monitored messages of a second type carrying data other than reports of such measurements;

extracting information from the messages of the second type; and combining measurement reports extracted from the messages of the first type with the information extracted from the messages of the second type to discover at least part of the neighbour cell frequency list used by the wireless device for neighbour cell measurements.

According to another aspect of this invention there is provided apparatus for discovering at least part of a frequency list used by an active wireless device in a cellular communications network for neighbour cell signal measurements, comprising:

a monitor for monitoring at least one signalling link carrying messages between two elements of the communications network;

a selector for selecting monitored messages of a first type carrying reports of measurements relating to propagation of wireless signals between the network and the device and extracting reports of measurements from the messages of the first type, independently of operation of said two elements of the network;

a selector for selecting monitored messages of a second type carrying data other than reports of such measurements and extracting information from the messages of the second type; and a combiner for combining measurement reports extracted from the messages of the first type with the information extracted from the messages of the second type to discover at least part of the neighbour cell frequency list used by the wireless device for neighbour cell measurements.

BRIEF DESCRIPTION OF DRAWINGS

A method and apparatus in accordance with this invention, for discovering the frequency list used by an active mobile station for reporting neighbour cell measurements, will now be described, by way of example, with reference to the accompanying drawings, in which:

FIGS. 4A, 4B and 4C are a data flow block diagram of a procedure for receipt and processing of a DTAP Handover Command message in accordance with an embodiment of the invention.

DETAILED DESCRIPTION

Figure 1:
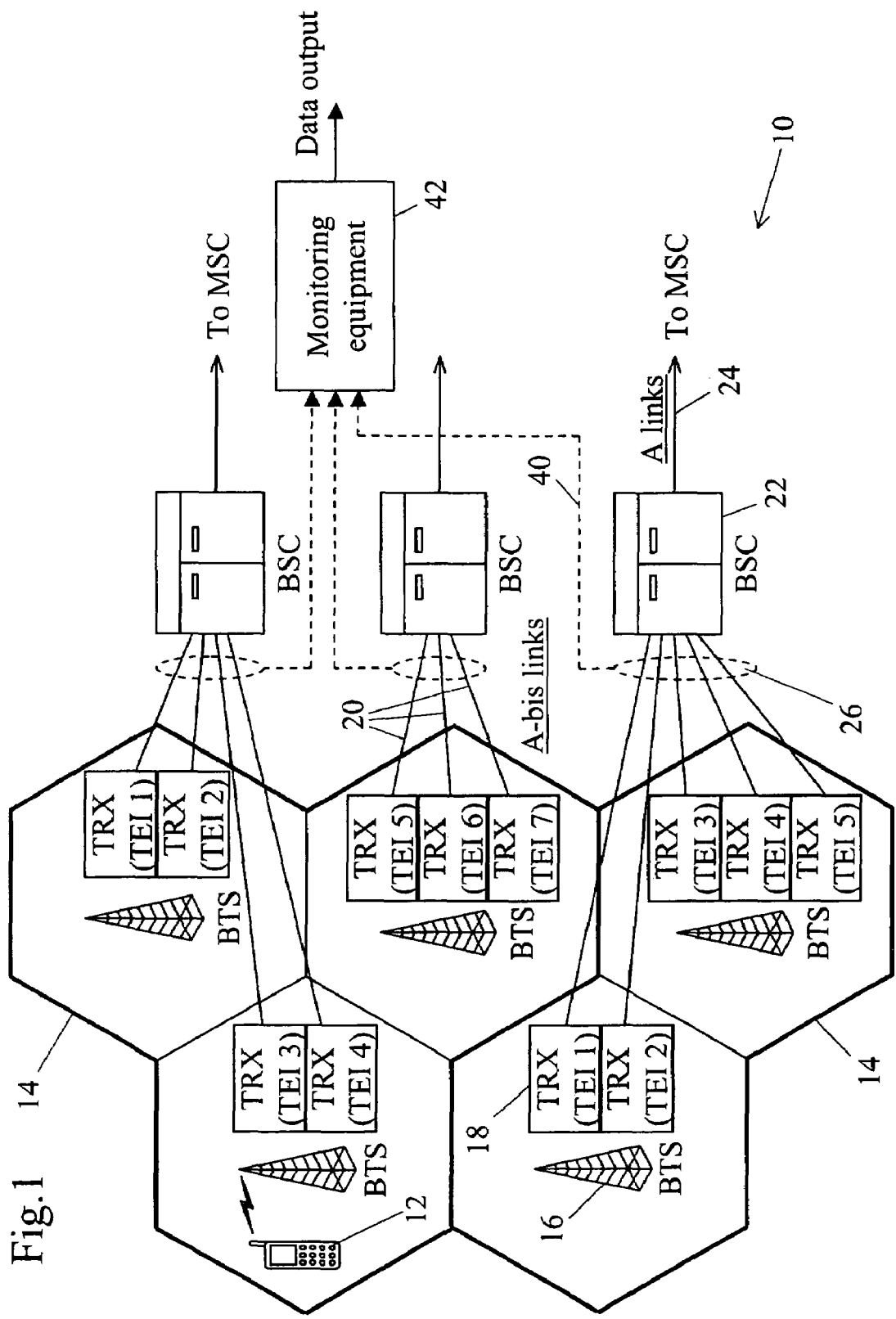
FIG. 1 is a schematic illustration of part of a GSM-type mobile telephone network incorporating equipment for implementing the invention.

FIG. 1 shows major elements of a GSM cellular mobile telephone network 10 for communicating with a mobile phone handset (MS) 12, with additional equipment to enable monitoring of measurement reports. For the sake of clarity the telecommunications transmission lines for carrying user voice and data signals are omitted; only the signalling links for control of operation of the network, which are of interest in the context of this invention, are shown.

Referring to FIG. 1, the mobile network 10 contains several cells 14, which are the basic unit of division of the coverage area for the purposes of radio spectrum management and are shown in FIG. 1 as conventional idealised hexagons. Each cell 14 contains a BTS 16 which houses one or more TRXs 18 for communicating with handsets over the radio "air interface", and these transceivers are connected via A-bis signalling links 20 to a BSC 22 which may control transceivers in more than one BTS 16. The sub-system comprising a BSC 22 and its associated BTSs 16 is sometimes referred to as a base station system (BSS). The BSCs 22 are themselves co-ordinated via A signalling links 24 by MSCs (not shown).

During operation of the network 10, various operations are performed to control and measure the radio transmissions over the air interface between the MS 12 and the TRX 18. For example, the BTS 16 and the MS 12 each continually measure the strength and the quality (bit error rate) of the signal received over the air interface, and the MS 12 also measures the strength of signals being received (on the respective beacon frequencies) from BTSs 16 in neighbouring cells. The measurements made by the MS 12 are transmitted to the TRX 18, and the BTS 16 reports them with its own measurements over the A-bis link 20 to the associated BSC 22 for use in managing handovers of communications between cells in response to movement of the MS 12.

This invention provides an A-bis link monitoring system and method for automatically discovering the cell default BA(SACCH) currently being used by an MS, to enable the neighbour cell measurements in Measurement Report messages from the MS to be associated with the correct cells.

The monitoring system includes probes 26 (FIG. 1) for passively monitoring signalling messages traversing the A-bis links 20, as described below. The monitoring is passive in the sense that the operation of the links 20 is undisturbed by the presence of the monitoring system, which simply makes copies of some or all of the message packets it observes traversing the links. The probes 26 are coupled to the links in such a way that the operating characteristics of the links 20 are not significantly altered. In the case of an optical link, for example, the coupling may comprise an optical power splitter and for an electrical link it may be a bridging isolator.

Figure 2:
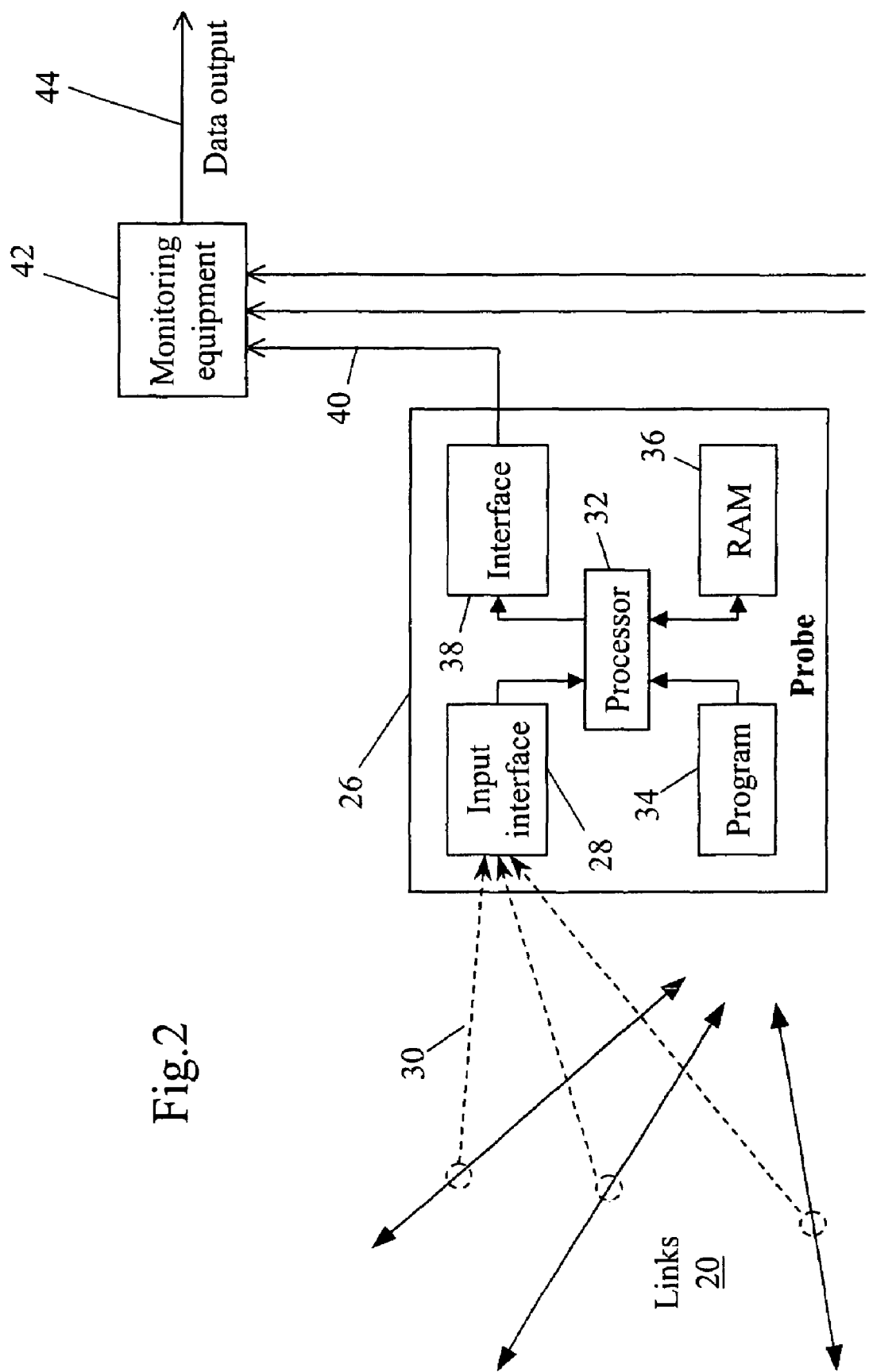
FIG. 2 is a block schematic diagram of a probe forming part of equipment for implementing the invention.

As shown in FIG. 2, each probe 26 has an input interface 28 which receives and conditions the signal received over a line 30 from the coupling to the relevant link 20 and which supplies the signal to a processor/CPU 32 operating under the control of software program instructions in a program store 34 and using a random access store 36. The processor 32 extracts messages from the signal and performs some initial processing (e.g. error checking and preliminary decoding). The messages are subsequently forwarded via an interface 38 and a communications bus 40 to monitoring equipment 42 for any necessary additional decoding and for further analysis as described below. This monitoring equipment provides a data output of a partially or fully discovered BA(SACCH) list for each cell on an output port 44. The probes 26 may comprise for example components of acceSS7 system equipment available from Agilent Technologies for monitoring messages traversing SS7 signalling networks.

Figure 3:
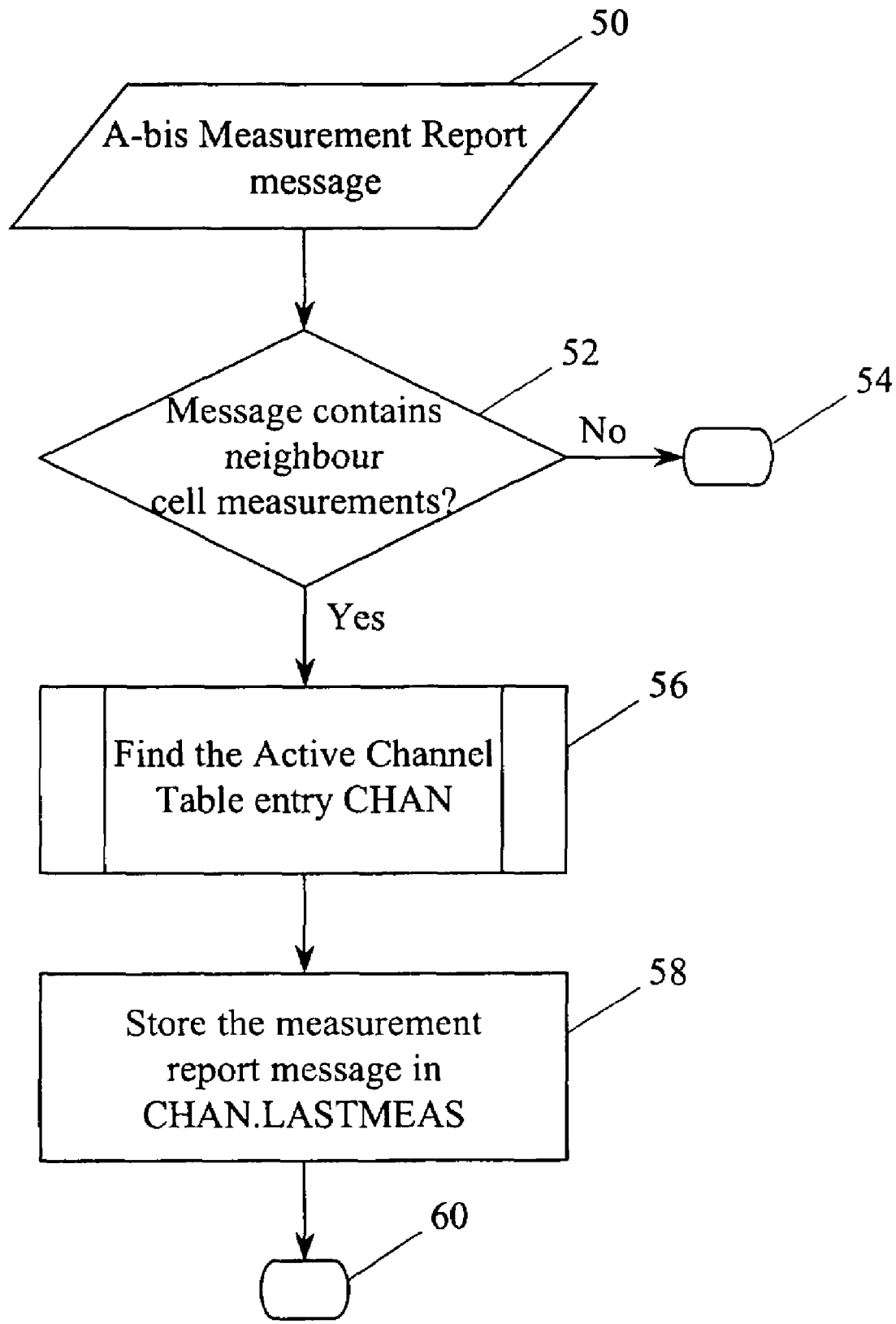
FIG. 3 is a data flow block diagram of a procedure for receipt and processing of an A-bis MEASUREMENT RESULT message in accordance with an embodiment of the invention.

The procedures for discovering the cell BA(SACCH) are shown in FIGS. 3, 4A, 4B and 4C. These procedures are executed concurrently to gather required data, with the second procedure (FIGS. 4A-4C) also using data gathered by the first procedure (FIG. 3). The procedures require three data tables or arrays in the probe random access store 36: a "TRX" table, a "Cell" table and an "Active Channel" table. These tables contain the data described below for the purpose of BA(SACCH) discovery, and may hold other data for other purposes.

The "TRX" table contains the following fields for the purpose of BA(SACCH) discovery—there should be one table entry for each TRX being monitored:

| | |
|---|---|
| A_CHAN_ID | Link and timeslot of the physical signalling channel from the BSC to the TRX |
| B_CHAN_ID | Link and timeslot of the physical signalling channel from the TRX to the BSC |
| TEI | LAPD (Link Access Protocol - Channel D) Terminal End Point identifier of the TRX |
| CGI | The Cell Global Identity of the cell (that is, the combination of Location Area Identity and Cell Identity) to which this TRX belongs |

The combination of A_CHAN_ID and TEI or B_CHAN_ID and TEI uniquely identifies a TRX. The TRX table may be statically configured using known network data. Alternatively the table may be populated automatically from data obtained by the link monitoring, using the methods described in U.S. Pat. Nos. 6,088,587 and 6,181,682.

The "Cell" table contains the following fields for the purpose of BA(SACCH) discovery—there should be one entry for each unique CGI in the TRX table:

| | |
|---|---|
| CGI | The Cell Global Identity of the cell |
| BA[32] | The current default BA(SACCH) for this cell. This is a list of up to 32 absolute radio frequency channel numbers (ARFCNs) giving the beacon frequencies of neighbouring cells. Each entry in the list is qualified by a confidence counter - see BA_CONF below |
| BA_CONF[32] | Confidence in each of the corresponding BA[ ] list entries described above. Each element is an integer between 0 and a limit value BA_CONF_LIMIT. A value greater than or equal to a threshold BA_CONF_OK indicates that the corresponding BA[ ] entry is of sufficient reliability to be used. Suggested values for BA_CONF_OK and BA_CONF_LIMIT are 2 and 4 respectively. These give reasonably fast discovery from the discovery method, with some tolerance of errors in discovery |
| BAIND | Broadcast Allocation (BA) sequence number indication (0 or 1). This is qualified by the BAIND_CONF confidence counter below |
| BAIND_CONF | Confidence in the above BAIND value. This is an integer between 0 and a limit value BAIND_CONF_LIMIT. A value greater than or equal to a threshold BAIND_CONF_OK indicates that the BAIND indication is of sufficient reliability to be used. Suggested values for BAIND_CONF_OK and BAIND_CONF_LIMIT are 2 and 4 respectively |

As with the TRX table, entries for each CGI being monitored may be set up statically using known network data, or be populated automatically from data obtained from the link monitoring using the methods described in the above-identified US patents. The other fields listed above are used in the BA(SACCH) discovery method and should be set to zero when a table entry is created.

The "Active Channel" table holds the following information for each active channel:

| | | |
|---|---|---|
| A_CHAN_ID | Link and timeslot of the physical signalling channel from the BSC to the TRX | |
| B_CHAN_ID | Link and timeslot of the physical signalling channel from the TRX to the BSC | |
| TEI | LAPD Terminal End Point identifier of the TRX | |
| CHANNEL | A-bis channel number (channel type, timeslot number and sub-channel number if applicable). See technical specification 3GPP TS 48.058 "Base Station Controller - Base Transceiver Station (BSC - BTS) interface; Layer 3 specification", section 9.3.1. | |
| LASTMEAS | The most recent A-bis MEASUREMENT RESULT message containing an embedded DTAP MEASUREMENT REPORT message seen on this channel. This will contain the data listed in the above-referenced 3GPP TS 44.018, FIG. 10.5.2.10.1. Of relevance to the method for BA(SACCH) discovery described herein are the following data items, for which sub-fields are included in the LASTMEAS field: | |
| | BA-USED | The sequence number of the BA(SACCH) used to code BCCH-FREQ-NCELL: a value of 0 or 1. |
| | RXLEV-NCELL[6] | Result of measurement on the ith neighbour cell. |
| | BCCH-FREQ-NCELL[6] | BCCH carrier of the ith neighbour cell. This is an index into the BA(SACCH), not the absolute radio frequency. |
| | BSIC-NCELL[6] | Base station identity code of the ith neighbour cell. |
| BAFLAG | Flag indicating whether there is a channel-specific BA associated with this active channel. This is the case when DTAP System Information Type 5 message(s) are contained within the A-bis CHANNEL ACTIVATION message or sent on the channel in a SACCH INFORMATION MODIFY message. The purpose of this flag is to inhibit the Cell BA discovery using Measurement Results and Handovers on this channel, because the channel-specific BA sent to the MS might be different from the cell default BA to be discovered. TRUE indicates that there is an associated channel-specific BA, FALSE that there is not. | |

An entry in the Active Channel table should be created for each A-bis CHANNEL ACTIVATION message detected on the monitored links. A suitable method is to first find the TRX table entry, using the link and timeslot number on which the message was received and the TEI from the message. Then create an entry in the Active Channel table using the A_CHAN_ID, B_CHAN_ID and TEI from the TRX table entry along with the A-bis channel number from the CHANNEL ACTIVATION message. The BAFLAG field should be set to TRUE if there is a channel-specific System Information 5, 5bis or 5ter in the CHANNEL ACTIVATION message.

Entries in the Active Channel table should be removed on receipt of a matching A-bis CHANNEL RELEASE message. Location of the appropriate table entry to be removed may be as for the CHANNEL ACTIVATION message.

If an A-bis SACCH INFORMATION MODIFY message is received for an active channel, then the BAFLAG for that channel's entry in the Active Channel table should be set TRUE.

The first of the procedures for discovering cell BA(SACCH), shown in FIG. 3, commences at 50 with receipt of an A-bis MEASUREMENT RESULT message, whereupon a test is performed at step 52 to determine whether the message contains neighbour cell measurements—not all A-bis MEASUREMENT RESULT messages contain neighbour cell measurements obtained by the MS. If the result of the test is No, the procedure terminates at 54. Otherwise, the procedure advances to step 56, to find an entry (hereinafter referred to as CHAN) for the relevant channel in the Active Channel table. The required entry is identified by reference to the link and timeslot number on which the message was received and the TEI and A-bis Channel Number from the message.

At step 58 data from the Measurement Report message are stored in the LASTMEAS field of the Active Channel table for channel CHAN. The data saved are the BA-IND sequence number (stored in BA-USED) and the set of neighbour cell measurement reports (up to six in the case of GSM). Each neighbour cell measurement report consists of the Rx level measurement (stored in RXLEV-NCELL[]), neighbour cell BSIC (BSIC-NCELL[]) and neighbour cell frequency as an index into the local serving cell's Broadcast Allocation (BCCH-FREQ-NCELL[]). Thereafter the procedure shown in FIG. 3 terminates, at step 60, awaiting receipt of another A-bis MEASUREMENT RESULT message.

Figure 4A:
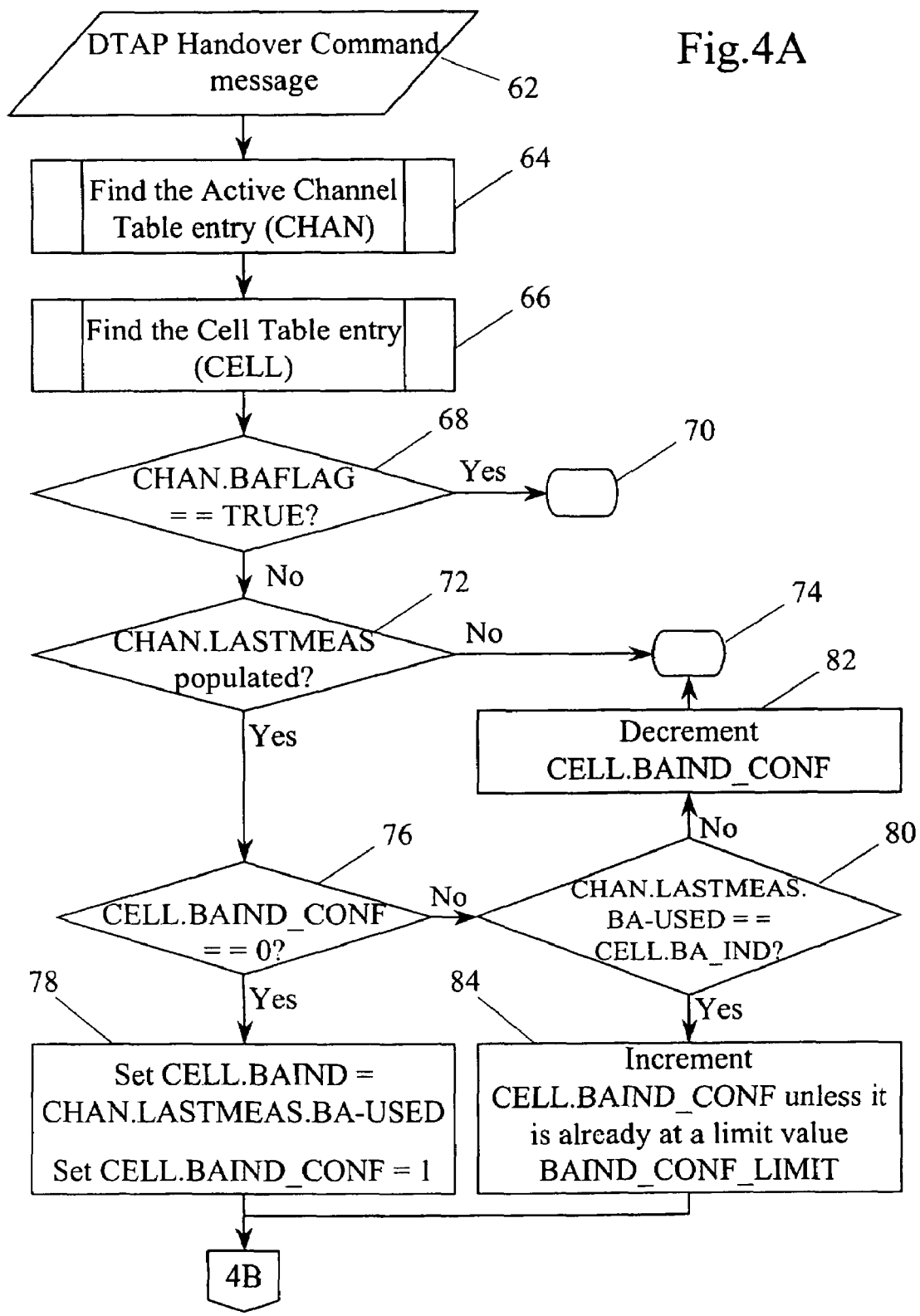
Figure 4B:
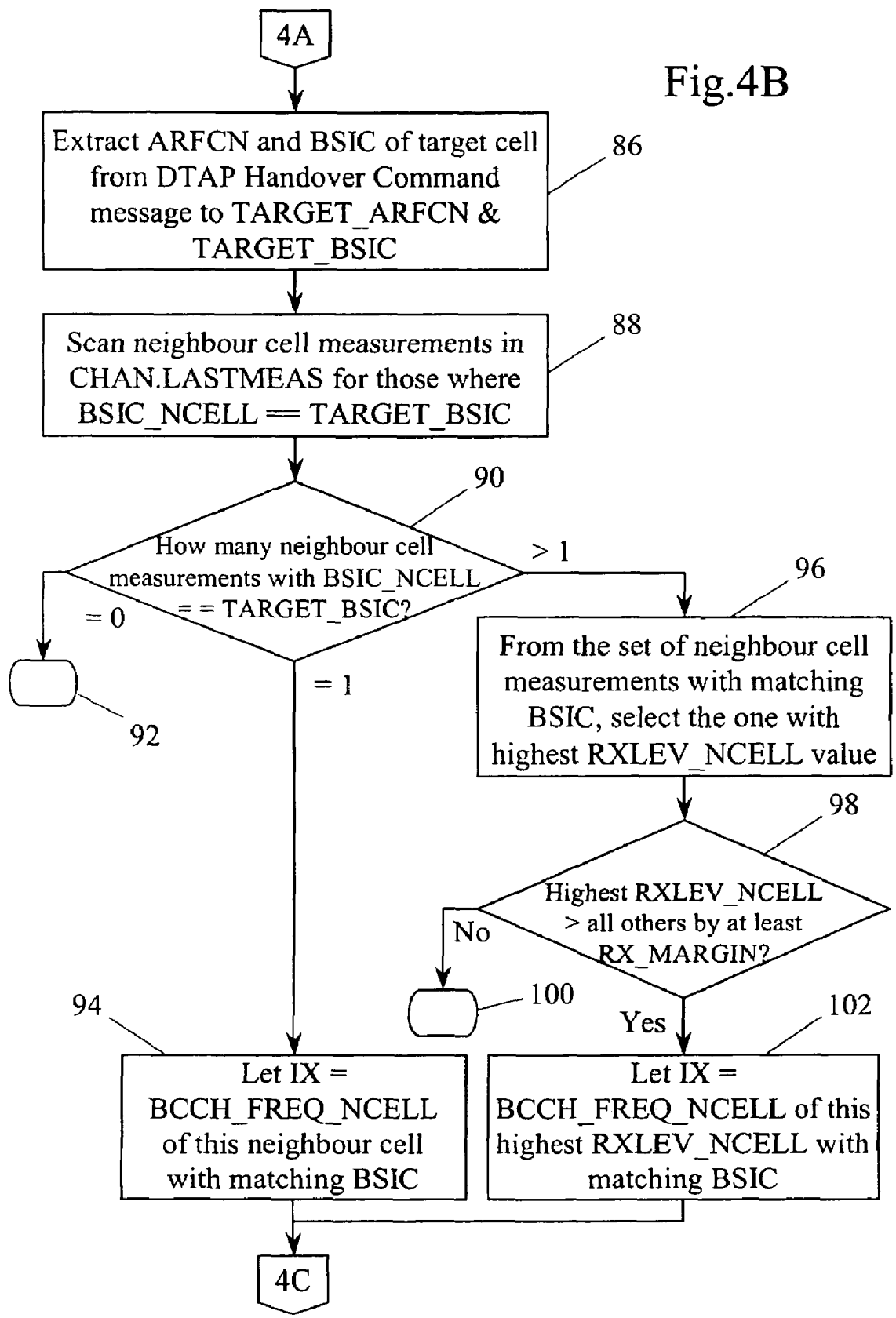

The second procedure is shown in FIGS. 4A to 4C, and is for processing DTAP Handover Command messages. Referring to FIG. 4A, the procedure starts at step 62 upon receipt of such a message. At step 64 the procedure finds an entry (referred to in the remaining description as CHAN) for the relevant channel in the Active Channel table, in the same manner as at step 56 in the procedure of FIG. 3. At following step 66 the procedure locates an entry in the Cell table. To this end the procedure first finds a TRX table entry using the signalling link and timeslot number on which the message was received, and the TEI from the message. Then the required Cell table entry (referred to as CELL in the rest of this description) is identified using the CGI from the selected TRX table entry.

A test is performed at step 68 to determine whether the flag value CHAN.BAFLAG is TRUE, indicating that a channel-specific BA(SACCH) is in use. If so, the procedure terminates at step 70. Otherwise another test is performed, at step 72, to determine whether the field CHAN.LASTMEAS is populated with data. If not, because no neighbour cell measurements have yet been received for this active channel, the procedure again terminates, at step 74.

If CHAN.LASTMEAS does contain measurement data, a third test is performed at step 76, to determine whether the confidence indicator CELL.BAIND_CONF has a value of zero. If it does, then at step 78 the BA sequence number indicator CELL.BAIND is set equal to the value in the CHAN.LASTMEAS.BA-USED sub-field (stored there previously at step 58 of the procedure described above with reference to FIG. 3). The value of the indicator CELL.BAIND_CONF is set to one and the procedure then continues as shown in FIG. 4B, as described below.

If the value of the CELL.BAIND_CONF indicator is not zero, then at step 80 a further test is performed, to establish whether the CHAN.LASTMEAS.BA-USED sub-field has the same sequence number value as the CELL.BA_IND field in the Cell table. If not, then at step 82 the inconsistency is taken into account by decrementing the confidence indicator CELL.BAIND_CONF, and the procedure terminates at step 74. However, if the sequence numbers do match then at step 84 the confidence indicator CELL.BAIND_CONF is incremented (unless it has already attained the limit value BAIND_CONF_LIMIT), to record the continuing consistency of BA(SACCH) sequence number observed, and the procedure continues as shown in FIG. 4B.

Referring to FIG. 4B, a DTAP Handover Command identifies the target cell for a handover by reference to the cell's BSIC and beacon frequency ARFCN. Accordingly, at step 86 the procedure extracts the ARFCN and BSIC values for the target cell from the DTAP Handover Command message and stores them in local temporary variables TARGET_ARFCN and TARGET_BSIC. As noted previously, in GSM there are up to six neighbour cell measurements in a measurement report. Each such measurement identifies the neighbour cell to which it relates by BSIC and an index into the BA list. At step 88 the procedure scans the neighbour cell measurements stored in CHAN.LASTMEAS to identify those where BSIC_NCELL has the value stored in TARGET_BSIC. At step 90 a test is made for the number of stored measurements that meet this criterion. If there are none the procedure terminates at step 92. If there is just one such measurement, then at step 94 a local variable IX is set to the value BCCH_FREQ_NCELL (index value of the BCCH carrier in the BA list) of this neighbour cell with BSIC matching TARGET_BSIC. Then the procedure continues as described below with reference to FIG. 4C.

If the test at step 90 determines there is more than one measurement matching the test criterion, then at step 96 the measurement with the highest RXLEV_NCELL value is selected. At step 98 a test is performed to establish whether the RXLEV_NCELL value of this selected measurement exceeds the RXLEV_NCELL values of all the other measurements identified at step 88 by a margin that is greater than a threshold RX_MARGIN, which may be for example 6 dB. If not, the procedure terminates at step 100. If the threshold margin is exceeded then at step 102 the local variable IX is set to the value BCCH_FREQ_NCELL of this neighbour cell with highest value of RXLEV_NCELL and with matching BSIC. Thereafter the procedure continues as shown in FIG. 4C.

Referring to FIG. 4C, at step 104 a test is made to find whether the confidence value CELL.BA_CONF for the potential entry IX in the BA list is zero. If not, then at step 106 a further test is performed of whether the entry at position IX in the CELL.BA list being assembled matches the value stored in TARGET_ARFCN. If these values match then at step 108 the confidence value CELL.BA_CONF[IX] for that list entry is incremented, unless it is already at the limit value BA_CONF_LIMIT, and the procedure then terminates at 110. If the tested values do not match then the confidence value CELL.BA_CONF[IX] for that list entry is decremented at step 112 and the procedure terminates at step 114.

If the confidence value CELL.BA_CONF tested at step 104 is zero, then at step 116 a search is performed for any entry n in the CELL.BA list for which CELL.BA[n] has the value TARGET_ARFCN (to determine if this ARFCN is currently recorded for another index in the BA list) and for which the confidence value CELL.BA_CONF[n] is greater than zero. At step 118 a test is undertaken of whether any match was found at step 116. If not, then this is taken to be the first discovery of the BA index mapping for this ARFCN and at step 120 the list entry CELL.BA[IX] is set equal to the value TARGET_ARFCN and the confidence level CELL_BA_CONF[IX] for this entry is set to one. Thereafter the procedure terminates at step 122. If a match was found at step 116, then this casts doubt on the potential entry in the CELL.BA list, and at step 124 the confidence value CELL.BA_CONF[n] of this ARFCN to BA index mapping is decremented, and the procedure then terminates at step 126.

Over time, the correlation of Measurement Report messages and DTAP Handover Command messages will build up the BA list of frequencies for each cell in the Cell table. The confidence counter BA_CONF associated with each entry in the BA list gives the confidence of the mapping between the index (BCCH-FREQ-NCELL) index i in Measurement Reports) and the corresponding absolute radio channel frequency. When the confidence of an individual BA entry reaches the threshold BA_CONF_OK then it can be assumed that the frequency in that position in the BA is valid. A BCCH-FREQ-NCELL index i in Measurement Reports may then be used to index the BA to derive the actual neighbour cell frequency. This can in turn be used for correct interpretation of the measurement reports for purposes such as QoS monitoring and determination of MS position.

The invention claimed is:

1. A method of discovering at least part of a frequency list used by an active wireless device in a cellular communications network for neighbour cell signal measurements, comprising:

monitoring at least one signalling link carrying messages between two elements of the communications network;
selecting monitored messages of a first type carrying reports of measurements relating to propagation of wireless signals between the network and the device
extracting the reports of the measurements from the messages of the first type, including received signal strength of beacon transmissions from at feast one neighbour cell and an identity of the neighbour cell; independently of operation of said two elements of the communications network and using equipment separate from the two elements of the communications network;

selecting monitored messages of a second type carrying data other than reports of such measurements;

extracting information from the messages of the second type; and combining the measurement reports extracted from the messages of the first type with the information extracted from the messages of the second type to discover at least part of the neighbour cell frequency list used by the wireless device for neighbour cell measurements.

2. The method of of claim 1, wherein identity of the neighbour cell is indicated indirectly by an index to a neighbour cell frequency list.

3. The method of claim 1, wherein the messages of the first type comprise DTAP Measurement Report messages.

4. The method of claim 1, wherein the messages of the second type are messages generated by the network in response to measurement values contained in messages of the first type.

5. The method of claim 1, wherein the messages of the second type contain information relating to identity of sections of the network adjacent to a current serving cell for the device.

6. The method of claim 1, wherein the messages of the second type are DTAP Handover Command messages.

7. Apparatus for discovering at least part of a frequency list used by an active wireless device in a cellular communications network for neighbour cell signal measurements, comprising:

a monitor for monitoring at least one signalling link carrying messages between two elements of the communications network;

a selector, separate from the two elements of the communication network, for selecting monitored messages of a first type carrying reports of measurements relating to propagation of wireless signals between the network and the device and for extracting reports of the measurements from the messages of the first type, the extracted reports including received signal strength of beacon transmissions from at least one neighbour cell and an identity of the neighbour cell, the selector operating independently of operation of said two elements of the network;

a selector for selecting monitored messages of a second type carrying data other than reports of such measurements and extracting information from the messages of the second type; and a combiner for combining the measurement reports extracted from the messages of the first type with the information extracted from the messages of the second type to discover at least part of the neighbour cell frequency list used by the wireless device for neighbour cell measurements.

* * * * *

UNITED STATES PATENT AND TRADEMARK OFFICE
CERTIFICATE OF CORRECTION

PATENT NO. : 7,706,798 B2 Page 1 of 1
APPLICATION NO. : 11/370821
DATED : April 27, 2010
INVENTOR(S) : Michael Hurst It is certified that error appears in the above-identified patent and that said Letters Patent is hereby corrected as shown below:

In column 10, line 66, in claim 1, delete "feast" and insert -- least --, therefor.

In column 11, line 14, in claim 2, delete "of of" and insert -- of --, therefor.

Signed and Sealed this

Twenty-ninth Day of June, 2010

David J. Kappos
*Director of the United States Patent and Trademark Office*